(No Model.)
J. HOFFMAN.
MOLDING MACHINE FOR MOLDING PLASTIC MATERIALS.
No. 458,754.  Patented Sept. 1, 1891.
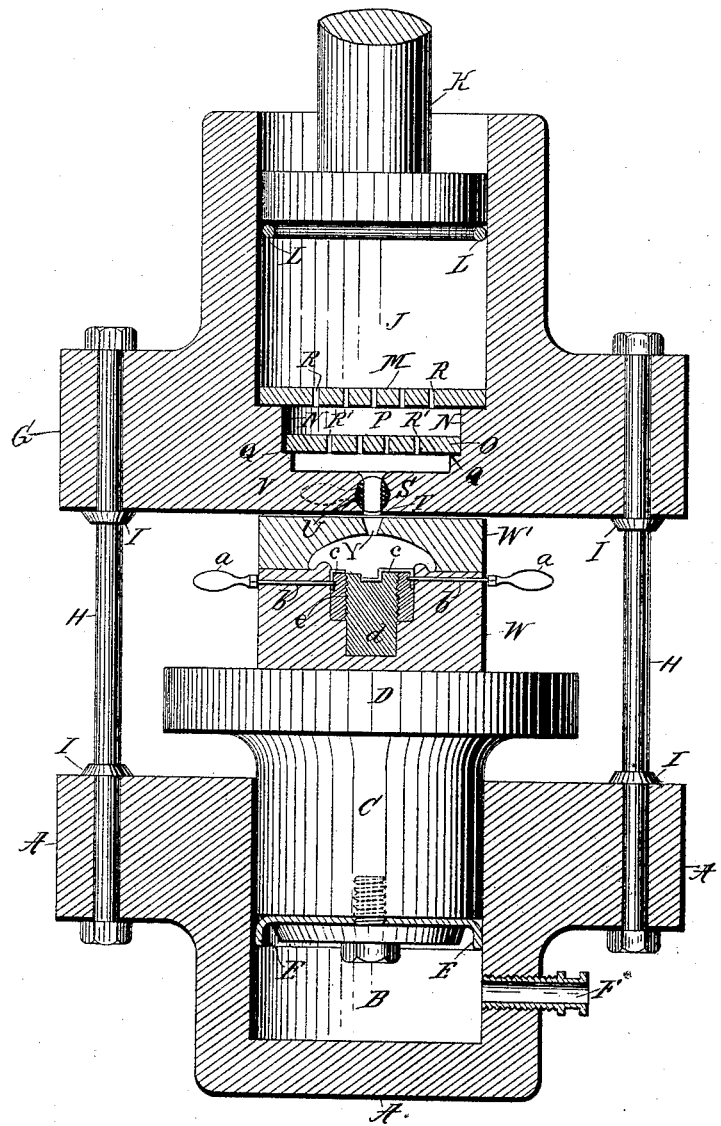
WITNESSES:
John Buckler,
Charles Ryder.
INVENTOR
Joseph Hoffman
BY Phillips Abbott
his ATTORNEY

UNITED STATES PATENT OFFICE.

JOSEPH HOFFMAN, OF HOBOKEN, NEW JERSEY, ASSIGNOR OF ONE-HALF TO CHARLES A. LIEB, OF NEW YORK, N. Y.

MOLDING-MACHINE FOR MOLDING PLASTIC MATERIAL.

SPECIFICATION forming part of Letters Patent No. 458,754, dated September 1, 1891.

Application filed April 21, 1891. Serial No. 389,844. (No model.)

*To all whom it may concern:*

Be it known that I, JOSEPH HOFFMAN, a citizen of the United States, and a resident of Hoboken, in the county of Hudson and State of New Jersey, have invented certain new and useful Improvements in Molding-Machines for Molding Plastic Material, of which the following is a specification.

My invention relates to a new and useful improvement in molding-machines for molding plastic material; and it consists in so constructing the apparatus that by one and the same operation of the machine the plastic material will be very thoroughly and homogeneously mixed; also, so that the exact amount only of material which is necessary to form the desired article will be passed into the mold; also I insure exactly the same degree of density, size, and shape in the manufactured product, and I also secure economy in manufacture and a reduced number of steps or processes needful to carry on the manufacture.

Heretofore considerable difficulty has been experienced in homogeneously mixing certain classes of material for the manufacture of molded articles; also in the molding of various articles it has been found practically impossible to get exactly the proper or identically the same amount of material between the molds at each time. Consequently if too little were present the molded articles have not all of them had the same density. On the other hand, if too much were present between the molds, then the articles were overcompressed, which resulted in subsequent swelling by reason of the elasticity of the material, which threw them out of shape and enlarged them beyond the desired dimensions. Sometimes, also, ribs appear upon the molded articles, and very frequently the molds are injured by reason of the crowding of the material through all joints or other possible places of escape. By my invention I obviate, as I believe, all of these defects.

The drawing illustrates a vertical section of the operative parts of my machine which are immediately connected with the invention. A base and other coacting parts not involved in the invention are not shown. They may be of any preferred form.

A is a casting having a chamber B in it, which is substantially the force-chamber of the hydraulic lift or ram.

C is a plunger having the ordinary table or head D on its upper part, and packing E at its lower edge, and water inlet and exit F.

G is another casting supported upon and held to the casting A by threaded bolts and nuts H. There may be as many of these bolts used as desired, and they may be provided with shoulders I for the more complete sustaining of the parts in their relative positions. The casting G has a chamber J within it, in which the mass of material to be molded is placed, in which chamber is a vertically-moving plunger K, preferably provided with a ring or other packing L, as usual. This plunger K is reciprocated by any suitable hydraulic means or weights for downward movement, and hydraulic or other means for upward movement, or by the operation of cams, cranks, or in any other preferred manner.

M is a plate set in the bottom of the chamber J, which is supported upon annular shoulders N N, made in the casting G, and O is another similar plate set in the bottom of an underlying chamber P, which is likewise supported upon shoulders Q, made in the casting G. The plate M has in it holes R R of such size as is preferred and as many as may be desired, and the plate O has similar holes R' in it. They are preferably staggered relative to the holes in the plate M, and beneath this plate O there is another chamber S, which has in its lower part an opening T, in which is set a cut-off valve U, provided with a handle V. W W' are the two parts of the mold. In the upper part W' there is an opening Y, which is adapted to register with the lower end of the opening T through the base of the casting G.

*a a* are two handles upon the ends of small steel rods *b b*, which extend through openings in the lower part of the mold and have screw-threads or other devices upon their inner ends, whereby metallic or other parts, such as *c c*, which are to be embedded in the article while being molded, may be held within the mold.

*d* is a plug which fits into a suitable recess in the lower part of the mold, which holds a threaded bushing or ferrule *e* upon its end in proper position within the mold. These last-recited devices are not at all essential to my invention. I letter and describe them simply because they are shown in the drawing and because I have illustrated and shown a lamp-socket for electric lamps as the article to be molded, this form of lamp-socket having been recently invented and patented by Charles A. Lieb, of New York city, concerning the molding of which there was great difficulty, which has been obviated by this present invention. It is shown as an example only.

The operation of the device is as follows: The material to be molded is first mixed as homogeneously as may be in any desired manner and by any desired apparatus. It is then placed in mass within the chamber J of the upper casting. The mold, the two parts of which have been properly superposed upon each other and the metal or other parts which are to be cast into the manufactured article having been suitably placed in the mold, if they are to be used, which of course is immaterial, is then placed on the table D of the ram C. The ram C is then lifted by hydraulic or other pressure up against the under side of the casting G, so that the hole or opening Y in the mold will properly register with and make a tight joint with the opening T in the casting G. The valve U is kept closed.

Now to operate the machine the plunger K is brought down by the mechanism, whatever it may be, which operates it and the material within the chamber J, which has already been mixed as homogeneously as may be, is forced through the holes R in the plate M into the underlying chamber P, during which, of course, the material is squeezed, forced, and in effect kneaded in a most thorough manner. The chamber P gradually becomes full and then a continuation of the power crowds the material through the staggered holes R' in the plate O, which are or may be somewhat smaller than those in the upper plate M. The material thence passes into the chamber S, and this chamber in turn becomes filled with the material. The valve U is now opened by proper manipulation of the handle V, and the material is forced down through the passage T in the casting G and through the opening Y in the part W' of the mold into the cavity of the mold. During this passage into chamber T through the plates M and O and through the chambers P and S and through the valve the material will be very homogeneously mixed. The passage of the material into the cavity of the mold continues until a predetermined pressure exerted upon the top of the plunger K has been reached. Then of course power and resistance equalize and the plunger K ceases to descend. The operative now understands that the molding has been properly effected. Thereupon pressure upon the plunger K is relieved. Next he shuts the valve U, which of course cuts off further movement of the material. The plunger C is now lowered, the mold is taken out, a new mold is substituted in its place, the plunger C is again lifted, and the operation thus repeated.

It is obvious that the machine itself may be used as the primary mixer by simply passing the material through the machine with no mold present and then replacing the material in the chamber J again, and this operation may be repeated, if desired, as many times as necessary.

It will be seen that by my invention I immediately prior to use very thoroughly mix or homogeneously compound the material which is to be molded and that this mixing may be effected in a most thorough manner because there may be as many perforated plates and interposed chambers as desired between the reservoir-chamber J and the mold; also, that I use only the exact quantity of material necessary to accurately mold the article; also, that there is no waste of material; also, that each and every one of the articles molded is subjected to exactly the same pressure, consequently they must all have the same density and the same size; also, that I avoid the laborous and expensive weighing or measuring of the material used for the molding, which method is usually practiced, and that the reservoir J, being once filled, the molding may continue until its contents is exhausted.

I do not limit myself to the details of construction shown and described, because they may be somewhat departed from, or many of them may be, and still the essentials of my invention be present.

I claim—

1. In a molding-machine, the combination of a movable support for the mold, a mold having an opening therein, a cylinder containing a chamber within which moves a plunger, which plunger is provided with means for reciprocating it, and an opening in the chamber constructed and arranged to register with the opening in the mold and provided with a cut-off or valve, substantially as set forth.

2. In a molding-machine, the combination of a movable support for the mold, a mold having an opening therein, a cylinder containing a chamber within which moves a plunger, which plunger is provided with means for reciprocating it, a perforated plate at the bottom of the chamber, and an opening in said chamber below the plate constructed and arranged to register with the opening in the mold, substantially as set forth.

3. In a molding-machine, the combination of a movable support for the mold, a mold having an opening therein, a cylinder containing a chamber within which moves a plunger, which plunger is provided with means for reciprocating it, a plurality of perforated plates at the lower end of the chamber, chambers or spaces between them, and an opening in said chamber below the lower plate constructed and arranged to register with the opening in the mold, substantially as set forth.

4. In a molding-machine, the combination of a cylinder containing a chamber for the reception of the material to be molded, a perforated plate in the lower part of the chamber at a distance from the bottom thereof, and an opening in the bottom of the chamber below the plate adapted to connect with a mold, substantially as set forth.

5. In a molding-machine, the combination of a cylinder containing a chamber adapted to receive the material to be molded, a plunger moving within the chamber, a mold composed of two solid closed and separable parts adapted to contain the material under pressure, held against the exterior of the cylinder, and a passage for the material from the chamber to the mold, which is smaller than the article to be molded, substantially as set forth.

6. In a molding-machine, a cylinder containing a chamber, a plurality of perforated plates located at or near the lower part of the chamber, spaces between the plates, a mold held against the exterior of the cylinder, an opening in the chamber below the lower plate which registers with an opening in the mold, and a plunger which moves through the chamber, substantially as set forth.

Signed at New York, in the county of New York and State of New York, this 16th day of April, A. D. 1891.

JOSEPH HOFFMAN.

Witnesses:
PHILLIPS ABBOTT,
WALTER H. CRITTENDEN.